US012566722B2

(12) United States Patent
Villareal et al.

(10) Patent No.: US 12,566,722 B2
(45) Date of Patent: *Mar. 3, 2026

(54) SYSTEM AND METHOD FOR DIRECT DEVICE COMMUNICATION WITH DIAGNOSTICS AND PROVISIONING

(71) Applicant: BLANCCO TECHNOLOGY GROUP IP OY, Joensuu (FI)

(72) Inventors: Jonathan Villareal, Austin, TX (US); Russ B. Ernst, Austin, TX (US); Daniel Oberg, Joensuu (FI); Markus Torma, Joensuu (FI); Tomi Lehtola, Joensuu (FI)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 0 days.

This patent is subject to a terminal disclaimer.

(21) Appl. No.: 18/237,279

(22) Filed: Aug. 23, 2023

(65) Prior Publication Data

US 2023/0409510 A1      Dec. 21, 2023

Related U.S. Application Data

(63) Continuation of application No. 17/020,657, filed on Sep. 14, 2020, now Pat. No. 11,748,296.

(Continued)

(51) Int. Cl.
*G06F 13/42*        (2006.01)
*G06F 1/26*         (2006.01)
(Continued)

(52) U.S. Cl.
CPC .......... *G06F 13/4282* (2013.01); *G06F 1/266* (2013.01); *G06F 8/61* (2013.01);
(Continued)

(58) Field of Classification Search
CPC ........................................................ G06F 8/65
See application file for complete search history.

(56) References Cited

U.S. PATENT DOCUMENTS 11,416,054 B2 * 8/2022 Nayak ................... G06F 13/385
2005/0154799 A1 * 7/2005 Feng ................... G06F 13/4004
                                                                  710/1
(Continued)

FOREIGN PATENT DOCUMENTS

CN          203324326        12/2013
CN          108073483         5/2018
(Continued)

OTHER PUBLICATIONS

Notice of Reasons for Refusal / Japanese Office Action dated Oct. 29, 2024 (Oct. 29, 2024), 9 pages, issued on related Japanese Patent Application JP 2022-516072, by the Japanese Patent Office.
(Continued)

*Primary Examiner* — Henry Tsai
*Assistant Examiner* — Juanito C Borromeo
(74) *Attorney, Agent, or Firm* — Dickinson Wright PLLC

(57)          ABSTRACT

There are provided systems and methods for mobile device diagnostics and provisioning, whereby connections are effectuated to communicate directly with hardware of mobile devices to perform diagnostics and other functions such as device erasure without the need to first install an app on the mobile device. In this manner, information such as detailed product identification, vendor identification, and diagnostic information may be quickly obtained from the mobile device, and diagnostics and erasure undertaken to return a previously owned device into the stream of commerce in an efficient manner.

16 Claims, 3 Drawing Sheets

100

Related U.S. Application Data

(60) Provisional application No. 62/899,616, filed on Sep. 12, 2019.

(51) Int. Cl.

| | |
|---|---|
| *G06F 8/61* | (2018.01) |
| *G06F 13/20* | (2006.01) |
| *G06Q 30/02* | (2023.01) |
| *H04M 1/72409* | (2021.01) |

(52) U.S. Cl.
CPC ........ *G06F 13/20* (2013.01); *H04M 1/72409* (2021.01); *G06F 2213/0042* (2013.01); *G06Q 30/0278* (2013.01)

(56) References Cited

U.S. PATENT DOCUMENTS

| | | | |
|---|---|---|---|
| 2008/0154404 A1 | 6/2008 | Kedem et al. | |
| 2009/0104799 A1* | 4/2009 | Liu | H01R 31/065 |
| | | | 439/92 |
| 2014/0066192 A1* | 3/2014 | Hollis | G07F 17/3241 |
| | | | 463/29 |
| 2014/0156242 A1 | 6/2014 | Bullara et al. | |
| 2015/0206200 A1 | 7/2015 | Edmondson et al. | |
| 2016/0274163 A1* | 9/2016 | Yin | G06F 13/385 |
| 2017/0169401 A1* | 6/2017 | Beane | H04W 24/00 |

FOREIGN PATENT DOCUMENTS

| | | |
|---|---|---|
| JP | 2013-182400 | 9/2013 |
| JP | 2018207195 | 12/2018 |
| JP | 2019014202 | 1/2019 |
| WO | 2016054352 | 4/2016 |
| WO | 2017100554 | 6/2017 |

OTHER PUBLICATIONS

Notice of Reasons for Refusal dated May 26, 2025, 9 pages to include English Translation, issued on related Japanese Patent Application 2022-516072, by the Japanese Patent Office.

* cited by examiner

100

105

TEST SYSTEM/
HOST SYSTEM

110

120

100A

105

TEST SYSTEM/
HOST SYSTEM

133A

110A

ELEMENT:
E.G. RESISTANCE,
FIXED OR VARIABLE

130A

110A

120

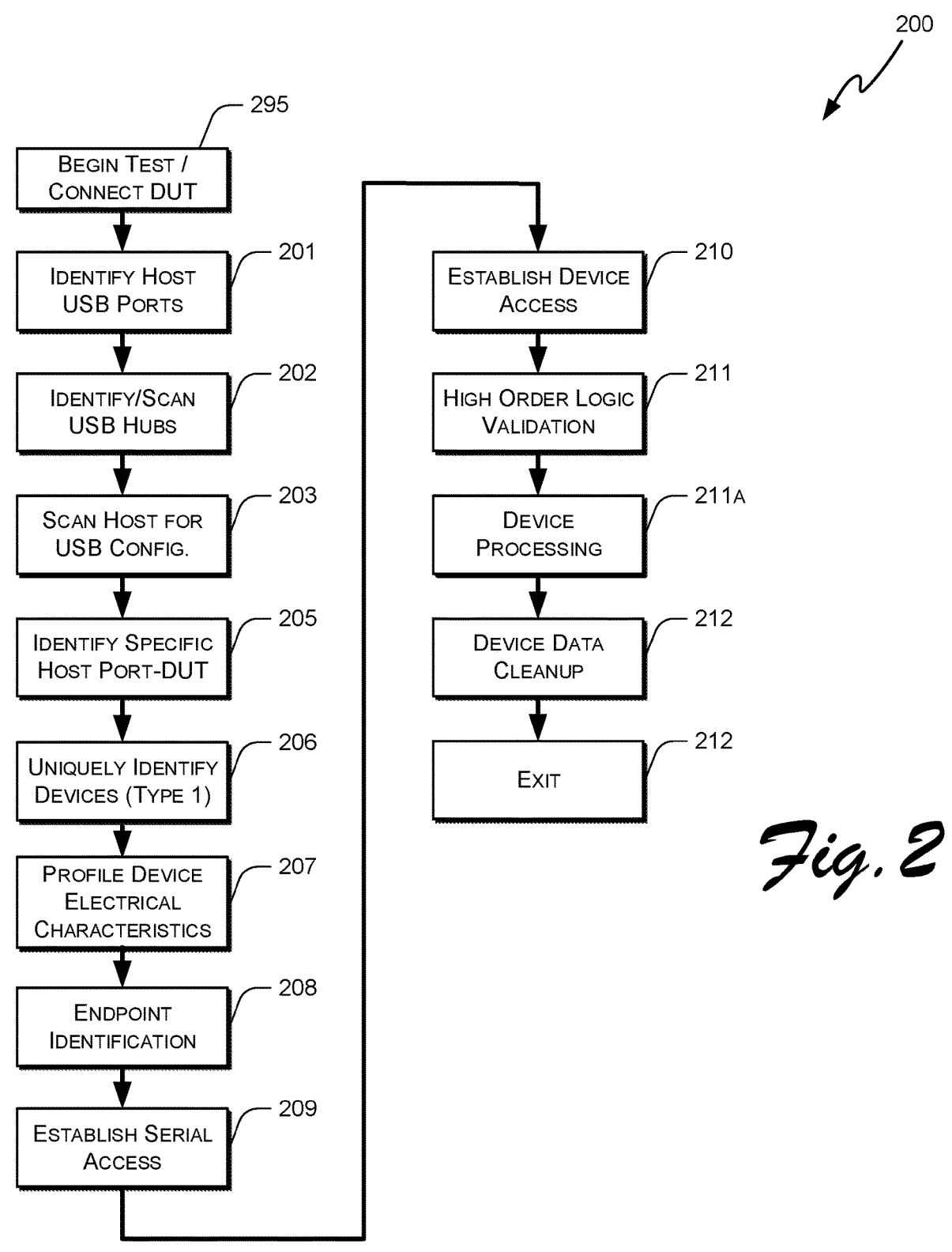
_Fig. 2_

SYSTEM AND METHOD FOR DIRECT DEVICE COMMUNICATION WITH DIAGNOSTICS AND PROVISIONING

CROSS REFERENCE TO RELATED APPLICATIONS

This application is a continuation of and claims priority to U.S. patent application Ser. No. 17/020,657, filed Sep. 14, 2020, now issuing as U.S. Pat. No. 11,748,296, and titled, titled, "SYSTEM AND METHOD FOR DIRECT DEVICE COMMUNICATION WITH DIAGNOSTICS AND PRO-VISIONING," which claims priority to U.S. Provisional Patent Application Ser. No. 62/899,616 filed Sep. 12, 2019 titled, "SYSTEM AND METHOD FOR DIRECT DEVICE COMMUNICATION WITH DIAGNOSTICS AND PRO-VISIONING," the disclosure of which is fully incorporated by reference herein for all purposes.

FIELD OF THE INVENTION

This application relates to systems and methods for diagnosis of operational states of mobile devices and related provisioning for mobile devices; more particularly, systems and methods of the present application provide for assessment of functionality and performance parameters through direct communication interfaces to mobile device components, and rapid and secure erasure of information stored on such mobile devices.

BACKGROUND OF THE INVENTION

Today, the use of mobile devices is widespread, and increasing numbers of people utilize such devices in their daily lives. As used herein, the term "mobile device," generally refers to any electronic device capable of being moved from place to place. Examples of such mobile devices include, but are not limited to cellular phones (also known more generally as "mobile phones"), smart watches, smart jewelry, portable digital assistants (PDAs), digital cameras, intelligent devices for the "Internet of Things" (or "IOT"), drone devices, mobile subscriber communication devices, tablet computers, media players, smart vehicles, laptop computers, and devices equipped with wireless intelligent agents installed such as Alexa, Google Voice, Siri, Cortana, and others. Consumers purchase millions of mobile devices such as cellular phones every year, driven by the desire for enhanced features and functionality; replacement of worn, damaged, partially nonfunctional, or slower operating devices; or simply, just to obtain the latest product based on consumer loyalty or to show off new models to friends and acquaintances. On the other hand, as more features and capabilities have been incorporated into newly-released mobile devices, the rapidly growing expense of such devices has created a secondary market for pre-owned but functional mobile devices. As such, an industry has evolved to process and recycle previously-owned mobile devices to bring them into operational condition for refurbishment and resale, or for parting out inoperable devices for valuable components or scrap.

Pre-owned mobile device processors (also known herein as "recyclers"), are faced with the challenge of taking in mobile devices such as used mobile phones that are of unknown functionality and operational state, assessing the functional condition of such devices, securely erasing all data from prior users from the mobile phones, and if necessary, effectuating any necessary repairs. With narrow profit margins arising from the competitive market conditions and pricing for recycled mobile devices, efficiency in the assessment, diagnostic, and erasure process is paramount. The recycler must quickly assess the type of device, its operational state, and conduct any necessary re-provisioning such as flashing and erasure of the mobile device in the most efficient manner possible to ensure that recycled devices are returned to the stream of commerce as quickly as possible.

In traditional mobile phone recycling processes, recyclers attempt to connect mobile devices to power/data sources such as a USB or Lightning port, and if the device is not password protected, protected through mobile device management ("MDM"), or through a cloud-based remote activation lock scheme such as Find My Phone ("FMIP"), the recycler attempts to install an application on the mobile device that may be used for diagnostics and/or device erasure. However, just assessing a device type or a device's state (such as whether it is locked or subject to MDM) can be problematic for devices that have been received in unknown working condition or partially operable condition (and may also require access to expensive third party databases to determine an activation lock status). Further, such installation of apps on the used mobile devices is time consuming and may not be possible if the display of the used mobile devices is cracked/broken or sufficiently nonfunctional to prohibit interaction with the devices (such as to confirm permissions that allow the downloaded applications to function). Further, some incoming mobile devices may have batteries in a fully discharged state, and bringing such discharged devices to an initial condition that allows initial operation may require a time-consuming battery charge process before the device may be processed through the assessment/diagnostic/erasure procedures of the device recycler.

In addition to mobile device recyclers, retail organizations such as mobile carriers (also known as cellular phone service providers) are also faced with the need to quickly assess, diagnose, and/or erase mobile devices brought in by customers in a retail setting or kiosk. To provide such a service, carriers were faced with purchasing and configuring expensive hardware to diagnose mobile phones potentially in each retail location or kiosk. Further, even with existing test systems or data transfer hardware, mobile devices needed to be unlocked and have a minimally functional display for a carrier to perform diagnosis and other functions on the mobile devices.

In sum, among other things, there is a need to provide systems and methods to perform diagnostics and re-provisioning (such as re-flashing the device or securely erasing) of mobile phones and other mobile devices without first installing an app on such devices. Further, what is needed are systems and methods to support diagnosis and provisioning of mobile devices in a retail setting with hardware commonly available in such settings.

SUMMARY OF THE INVENTION

The following technical disclosure is exemplary and explanatory only and is not necessarily restrictive of the invention as claimed.

In one aspect, an embodiment of the present invention may, through a serial connection or a USB-type connection communicate directly with the hardware of mobile device to obtain relevant information from the device without initial installation of an app on the mobile device. In various embodiments of the present invention discussed more fully below, detailed product, vendor, and status information may be obtained from the mobile device quickly and even if a display of the mobile is non-functional, or if a battery of the mobile device is in a discharged state. Further, diagnostics and certain provisioning actions may be performed by a host system connected to a mobile device without the need to install an app on the mobile device. Additionally, in various embodiments, a mobile carrier may conduct analytics and mobile device provisioning in a retail setting without the need to purchase additional hardware beyond a computer system configured to operate methods of the present invention along with interface cables as described herein. In the retail setting or in a kiosk, a mobile device may be attached to the test system via a USB cable, and a web browser configured with a plugin may operate on a computer or tablet of the retail vendor/kiosk to conduct diagnostic testing and/or provisioning of the connected mobile device in accordance with aspects of the invention described herein.

In additional embodiments of the present invention, thorough serial connections established between and the mobile device and the host system, sophisticated analytics, diagnostics, and provisioning functions such as erasure may be conducted without the need to have a user or test system first install an app on the mobile device. Further, various embodiments may conduct diagnostics and provisioning of a mobile device without rooting or jailbreaking the mobile devices from their factory-set condition.

In one implementation, an electronic system is interfaced to the mobile unit under test through a cable such as a serial cable, and preferably a USB-compatible cable. In additional embodiments, the interconnecting cable may utilize an element that is intended to modify the voltage/current profile passing between the cable to the mobile device under test to activate particular functionality within circuits (such as in chip sets or controllers) that comprise the mobile device. In yet another embodiment, the interconnecting cable is a USB On-The-Go (OTG) compatible cable, wherein the element is connected in-between the identification (ID) pin and the ground (GND) pin. In an additional embodiment, the element has a fixed resistance value. In yet another embodiment, the resistance value of the element may be variable, through manual techniques such as adjusting a potentiometer by hand, or through automated techniques, such as by changing the resistance value through an interface to a digital potentiometer or an interface to an analogue semiconductor component integrated within the cable. As set forth above, these embodiments utilizing an element with a fixed resistance value or an element with a variable resistance value are in addition to the preferred embodiment of a standard USB cable (with pull-up resistor included, if so equipped).

There is provided a method that comprises electrically connecting a mobile device to a USB port of a host system; uniquely identifying the USB port and a type of the mobile device attached to the USB port; adjusting electrical performance of the USB port based on identified device type and desired function; identifying a current state of the mobile device; establishing a serial connection between the mobile device and the host system; and performing diagnostics and device provisioning functions for the mobile device. An electrical performance of the USB port may be modified, for example, by adjusting a resistance in a USB cable between the mobile device and the host system. A device state of the mobile device may be switched in response to identifying a current device state of the mobile device is not one of recovery mode or download mode. In another aspect, a method of the present invention further comprises providing power to the mobile device through a USB the cable connected between the host system and the mobile device. Further, in another aspect, identifying a current state of the mobile device further comprises determining available data connection types for the mobile device. In yet another aspect of the present invention, the serial connection between the mobile device and the host system comprises one of a USB protocol and an RS-232 protocol. Additionally, aspects of the present invention may comprise retrieving, from the mobile device, a serial number of a component installed in the mobile device; and determining the component is an originally installed component of the mobile device. Any number and types of identifying information may be obtained for components installed within the mobile device. One embodiment comprises obtaining a list of serial numbers of components installed in the mobile device; determining, (for example through a database lookup) for each of such installed components, whether each respective component was originally installed at time of manufacture of the mobile device. An additional aspect involves determining a resale value of the mobile device based upon at least whether a respective component was originally installed at time of manufacture of the mobile device, and in another embodiment, involves planning a repair or upgrade of the mobile device based upon at least whether a respective component was originally installed at time of manufacture.

Other embodiments of the present invention may include a system comprising a host system comprising a processor, a memory electrically coupled to the processor, a storage device coupled to the processor, a user interface electrically coupled to the processor, and a USB port connection coupled to the processor; the memory may be further configured with software that when executed performs the following steps: electrically connecting a mobile device to a USB port of a host system; uniquely identifying the USB port and a type of the mobile device attached to the USB port; adjusting electrical performance of the USB port based on identified device type and desired function; identifying a current state of the mobile device; establishing a serial connection between the mobile device and the host system; and performing diagnostics and device provisioning functions for the mobile device. An electrical performance of the USB port may be modified, for example, by adjusting a resistance in a USB cable between the mobile device and the host system. A device state of the mobile device may be switched in response to identifying a current device state of the mobile device is not one of recovery mode or download mode. In another aspect, a steps executed by systems of the present invention further comprise providing power to the mobile device through a USB the cable connected between the host system and the mobile device. Further, in another aspect, identifying a current state of the mobile device further comprises determining available data connection types for the mobile device. In yet another aspect of the present invention, the serial connection between the mobile device and the host system comprises one of a USB protocol and an RS-232 protocol. Additionally, aspects of the present invention may comprise retrieving, from the mobile device, a serial number of a component installed in the mobile device; and determining the component is an originally installed component of the mobile device. Any number and types of identifying information may be obtained for components installed within the mobile device. One embodiment comprises obtaining a list of serial numbers of components installed in the mobile device; determining, (for example through a database lookup) for each of such installed components, whether each respective component was originally installed at time of manufacture of the mobile device. An additional aspect involves determining a resale value of the mobile device based upon at least whether a respective component was originally installed at time of manufacture of the mobile device, and in another embodiment, involves planning a repair or upgrade of the mobile device based upon at least whether a respective component was originally installed at time of manufacture.

BRIEF DESCRIPTION OF THE DRAWINGS

A more complete understanding of the present invention may be derived by referring to the detailed description and claims when considered in connection with the following illustrative figures.

FIG. 2 depicts an exemplary flow diagram of steps used to implement aspects of the present invention.

DETAILED DESCRIPTION

Figures 1, 1A:
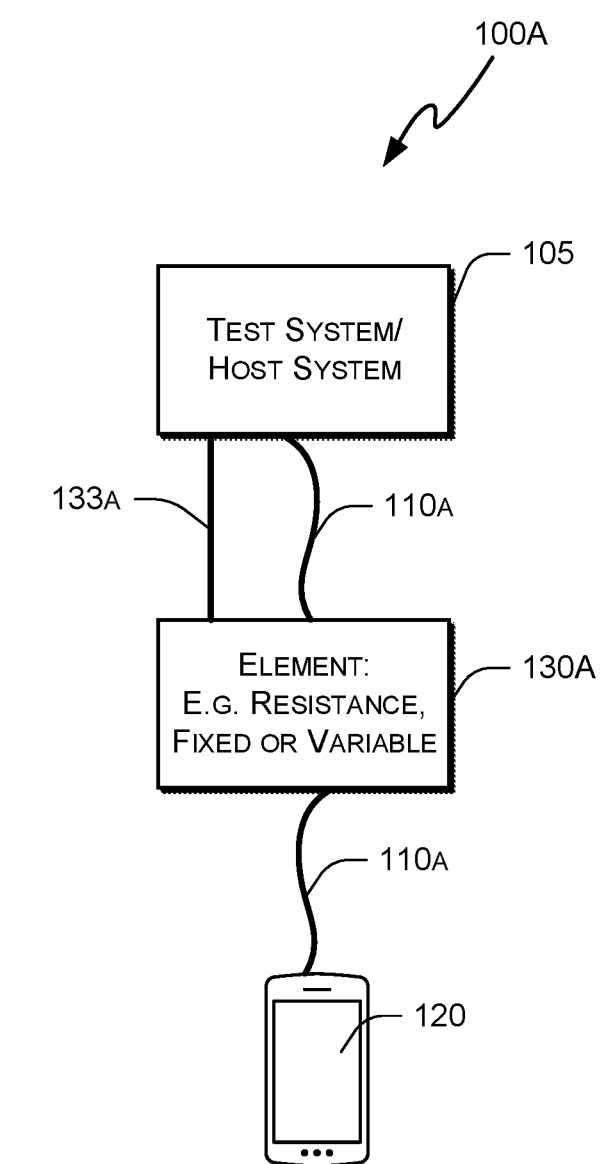
FIG. 1 illustrates a schematic view of an embodiment of a system of the present invention.
FIG. 1A illustrates a schematic view of an embodiment of a system of the present invention including a resistance element electrically coupled to the serial cable of the present invention.
Figure 1B:
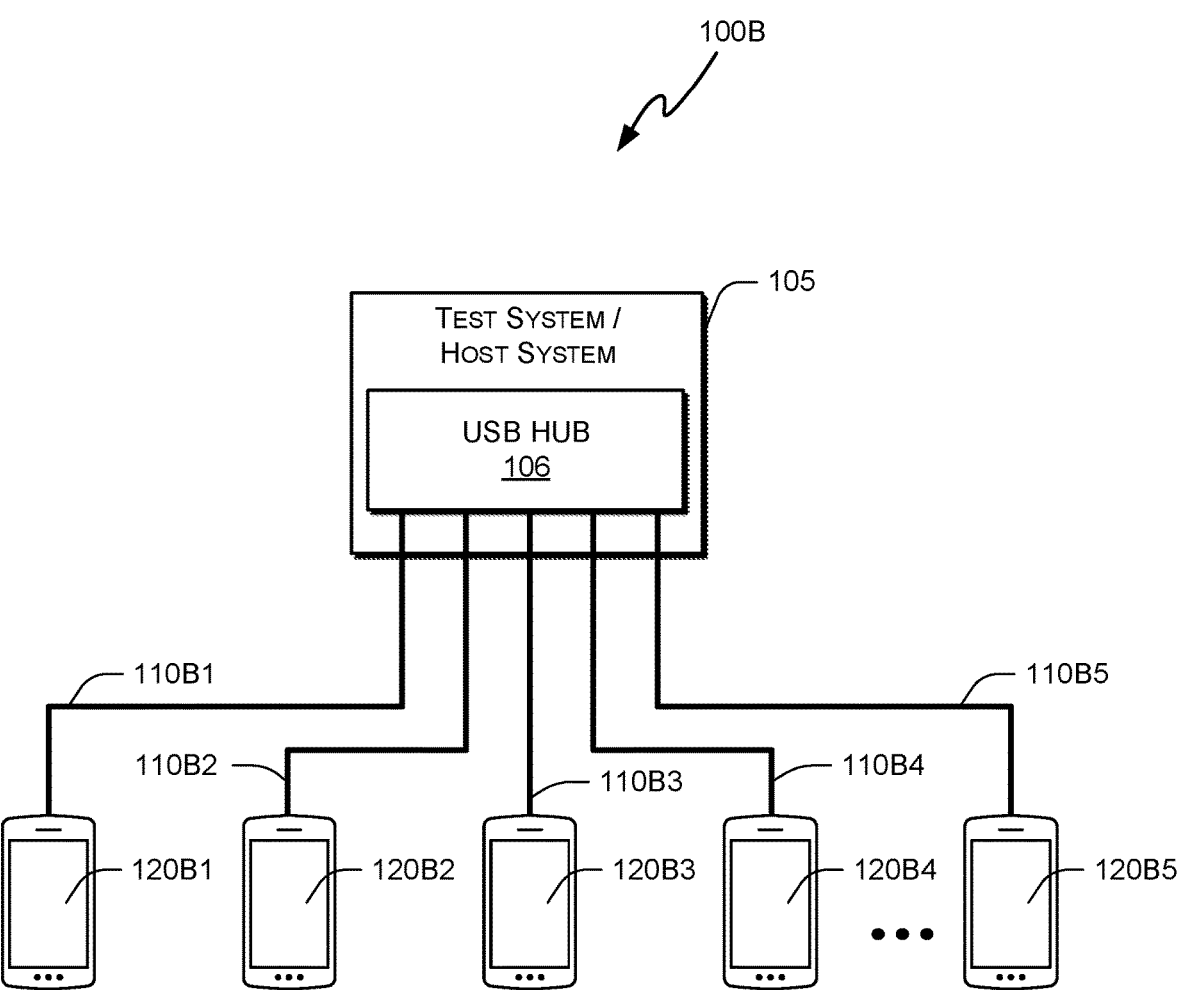
FIG. 1B illustrates a schematic view of an embodiment of a system of the present invention wherein multiple mobile devices can be concurrently processed by the host system.

An embodiment of the present invention can be understood in context of FIGS. 1, 1A, 1B, and 2 as follows. The system 100 shown in FIG. 1 (or alternatively, 100A in FIG. 1A) executes steps to perform diagnosis on the Device Under Test 120 (also referred to herein as "Mobile Device 120") that is electrically connected to the Host System 105 through cable 110 (or 110A in the case of FIG. 2), and the cable 110 or 110A may comprise or further comprise a USB cable. The cables 110, 110A, or 110B may also optionally comprise customized cables to support various features required for serial communication in the present invention. FIG. 1B illustrates a system 100B where a plurality of Mobile Devices 120B1-120B2 are respectively connected through cables 110B1-110B5 to a USB hub 106 that is shown as part of the Host System 105. Those of skill in the relevant arts appreciate that the USB hub 106 may be internally connected within the Host System 105 or may be a separate component interfaced to the Host System 105 and subsequently connected as shown to Mobile Devices 120B1-120B5. Those of skill in the art also appreciate that while five mobile devices are illustrated as connected to the Host System 105, fewer or more devices may be interfaced based on the intended scale of the processing organization that is operating the Host System 105. The Host System 105 may comprise a computing device, with custom or conventional components, such as a processor, a local memory such as RAM, non-volatile memory such as FLASH memory, long term memory such as a hard disk or solid date drive, a network adaptor, and any number of input and/or output devices such as a keyboard, mouse, monitor, touch screen, microphone, speaker, motion sensor, orientation sensor, infrared sensor, temperature sensor, humidity sensor, electrical current sensor, light sensor, voltage sensor, current sensor, USB hubs as shown in FIG. 1B, and the like. In certain embodiments, the Host System 105 may comprise a laptop or a tablet computer configured to communicate with Mobile Device 120 (such as a mobile phone) though electrical communications implemented by the cable 110 (such as a USB cable).

The various memories of the computing device may facilitate the storage of one or more computer instructions, such as software code and/or software program, which may be executable by the processor to perform the methods of the invention. A computing device may comprise an embedded processor in such as a personal computer, a server, a mobile phone, a smart phone, a tablet computer, a kiosk, a portable computer, a vehicle-embedded computer, and the like. Further, databases, systems, and/or components of the present technology may include any combination of databases, systems, and/or components at a single location or at multiple locations. Each database, system, and/or component of the present technology may comprise any suitable security features, such as firewalls, access codes, encryption, de-encryption, compression, decompression, and the like.

The present technology may be embodied as a method, a system, a device, and/or a computer program product, for example within a mobile device diagnostic and provisioning system. Accordingly, the present technology may take the form of an entirely software embodiment, an entirely hardware embodiment, or an embodiment combining aspects of both software and hardware. Furthermore, the present technology may take the form of a computer program product on a computer-readable storage medium having non-transitory computer-readable program code embodied in the storage medium. Any suitable computer-readable storage medium may be utilized, including any combination of hard disks, solid state drives, CD-ROM, FLASH memory, optical storage devices, magnetic storage devices, USB memory devices, any appropriate volatile or non-volatile memory system, and the like. The present technology may include a downloadable and/or cloud-based non-downloadable computer program product and/or methods.

Software and/or software elements according to various aspects of the present technology may be implemented with any programming, scripting, or computer language or standard, such as, for example, AJAX, C, C++, Java, JavaScript, FORTRAN, COBOL, assembly, binary machine language, PERL, Python, Ruby, eXtensible Markup Language (XML), PHP, CSS, etc., or any other programming and/or scripting language, whether in software or firmware, or whether now known or later developed. Further, the present technology may be used in conjunction with a computing device running any operating system such as any version of Windows, MacOS, OS/2, BeOS, Linux, UNIX, Symbian, RaspbianOS, OSX, tvOS, watchOS, TizenOS, Android, iOS, AndroidWear, or any other operating system, whether now known or later developed.

In addition, the present technology may employ any number of conventional techniques for data transmission, signaling, data processing, network control, and the like. Computing devices according to various aspects of the present technology may communicate with each other by one or more telecommunication networks. The telecommunication network may comprise a collection of terminal nodes, links, and any intermediate nodes which are connected to enable communication (including transfer of data) at a distance between the terminal nodes. In some embodiments, a terminal node may comprise a computing device. The telecommunication network may comprise any suitable communication system, such as the Internet, an intranet, an extranet, WAN, LAN, WiFi, Bluetooth, Zigbee, Z-Wave, satellite communications, cellular radio network, wireless network, telephone network, cable network, and the like.

Moreover, computing devices according to various aspects of the present technology may communicate over the telecommunication network using TCP/IP, HTTP, HTTPS, FTP, IPX, AppleTalk, IP-6, NetBIOS, OSI, serial communication protocols (including RS-232), and/or any number of existing or future protocols. The telecommunication network may be simply referred to as a network.

The cable 110 may comprise a USB cable with a connector conforming to version 2.0, 3.x (that is, any desired implementation of USB 3), or any other industry standard USB implementations, or may comprise any desired cable to establish a connection to the Mobile Device 120; and further, the cable 110 may incorporate an interface compatible with the Mobile Device 120 including, but not limited to, USB mini port, a USB micro port, a Lightning port, a Thunderbolt port, an Apple 30-pin port, a serial port, or any desired port to establish electrical communication between the Host System 105 and the Mobile Device 120. In various embodiments, as shown in FIG. 2, a fixed or variable resistor 130A may be integrated with, or electrically coupled to cable 110A to allow specific protocols to be invoked within the hardware of the Mobile Device 120. In certain embodiments, the Host System 105 may control the resistance 130A applied to the cable 110A by altering a signal applied to control line 133A.

A Mobile Device 120 may be electrically connected to the Host System 105 at any convenient time, such as during step 295 shown in FIG. 2. Power is provided to the Mobile Device 120 through the cable 110 (or 110A, or 110B, depending on the configuration) so if the battery state of the Mobile Device 120 is complexly discharged, diagnosis and provisioning may still take place. Although in preferred embodiments, no app is installed on the Mobile Device 120, to accomplish certain functions it may be desired to install an app on Mobile Device 120 should the need arise. However, a comprehensive suite of diagnostics, provisioning, and erasure functions are implemented in various embodiments of the present invention with no need for app installation in any step of the process.

Referring to FIG. 2, in the Host System 105 scans 201 the Host System for available USB Ports. If a USB port on the Host System 105 is damaged, and not responsive, the process may identify such faulty ports and report to an end user of the System 100. In this manner, the end user may be made aware that an issue exists with a specific USB port, thus reducing guesswork for the end user and avoiding an unnecessary tech support phone calls. Next, the Host System 105 scans 202 for any USB hubs that may be attached, as USB hubs may cause issues if they are not properly identified before configuration and testing is undertaken. As a result of this step 202, data corruption and restore errors (in addition to other faults) may be avoided. The embodiment of the present invention then scans 203 the Host System to determine whether the Host System is equipped with USB 2.0 Ports or USB 3.x Ports, as certain device types may require one USB type or the other to establish and operate a serial connection as specified in the embodiments described below. Then, the Host System 105 uniquely identifies 205 which specific USB port a mobile device under test is attached to, which is of particular importance when an operation is set up to process multiple mobile devices simultaneously in an approach similar to that shown in FIG. 1B (where multiple Mobile Devices 120B1-120B5 are connected to the Host System 105).

As a next step, the Host System 105 uniquely identifies 206 every attached mobile device that includes a particular operating system, for example the Android operating system. Other embodiments may uniquely identify every iOS mobile device that is attached, and yet other embodiments uniquely identify any device that has an operating system of a desired type. By identifying mobile devices that are configured with particular operating system configurations, multiple devices, even ranging into the hundreds or thousands, may be processed simultaneously as the subsequent processing steps may be tailored to the specific operating system requirements of each respectively attached mobile device.

In one aspect, the electrical characteristics of each mobile device that is connected to the Host System 105 are profiled 207, and if necessary, electrical performance of USB ports to which mobile devices are respectively connected are adjusted within desired ranges based on device type and desired function. For example, an amount of available current flowing between a mobile device and the connected Host System can be measured to ensure the mobile device is receiving the proper amount of amps of current (and proper supply voltage) that is required by the mobile device to perform the required functions. In various embodiments, the electrical operating characteristics of specific USB ports of the present invention may be programmatically adjusted to maintain electrical parameters (e.g. amps, volts, watts) within desired ranges. Alternatively, or in addition, a resistance 130A in the USB cable 110A may be adjusted manually or via a control signal 133A provided from the Host System 105A. For further example, power overconsumption is common with USB-C devices, and this needs to be programmatically controlled when processing mass quantities of devices at once, or when a single mobile device is connected to the Host System but the port is not properly electrically coupled.

Embodiments of the invention then identify 208 a current device state/activation state of a connected Mobile Device 120, without interacting with an operating system that is installed on the Mobile Device 120. Such states may include, for example, Charge Only State, DFU, Recovery Mode, Boot OS, Demo Mode, or another state. Depending on the current state (or mode) of the Mobile Device 120, various actions may be undertaken to switch state of the Mobile Device 120, continue processing, or report to the system user. For example, if the device is in a recovery mode, or download mode, this step will identify the device mode, and be able to trigger software executed by the Host System 105 to perform the next task without human interaction. Steps undertaken in this step 208 or later may be tailored to the operating system installed on the particular Mobile Device 120. For example, if the Mobile Device 120 is an iOS-installed device in Device Firmware Update mode ("DFU"), aspects of the present invention certain processes may be undertaken to release the Mobile Device 120 from the DFU mode. Further, once the mode of the Mobile Device 120 has been identified, an activation state of the Mobile Device 120 is then determined, and this determination is made in part based upon the type of device.

As an advantage over prior approaches, performing the state/mode identifying step 208 allows for proper identification of mobile devices that were previously assumed dead or otherwise nonfunctional, or that could not be identified in a mass-production scale of device recycling. As a result of this step, all available data connection types for the Mobile Device 120 are identified for further processing. After step 208, diagnostic actions may be undertaken at any desired time, such as in step 211A discussed below.

In another aspect of the invention, access to the connected Mobile Device 120 is established 209 with a serial communication protocol, such as a USB protocol or an RS-232 protocol. In certain device types, the serial connection must be established to allow devices that are configured with AOS, TizenOS, MacOS, WindowsOS, BBOS, Windows-PhoneOS, PebbleOS, FireOS, or SymbianOS operating systems to interoperate with the Host System 105 to execute steps of the present invention. Those of skill in the relevant arts appreciate that multiple serial protocols exist, and any desired serial protocol may be utilized for any desired purpose in the implementation of the present invention. And in a further aspect, once serial connection is established, electronic access to the Mobile Device 120 is established 210, allowing the mobile device to be scanned by and controlled by the Host System 105 without regard to the operating system that is installed on the Mobile Device 120, and thus data may be extracted from the Mobile Device 120 without the need for extraordinary measures or previous installation of an app on the Mobile Device 120. In a next aspect in FIG. 2, a high order logic validation step 211 is conducted, allowing for verification that all previous steps completed successfully, data from the Mobile Device 120 can be properly accessed, and the Mobile Device 120 is prepared to accept commands from the Host System 105 and corresponding steps in the software being executed in the application running on the Host System 105.

Obtain Initial Information and Pairing Status

After high order logic validation 211 occurs, aspects of the present invention corresponding to diagnostics and device provisioning may take place 211A, or such diagnostics and device provisioning may occur after completion of the process 200, or at any other desired time with respect to process 200. For example, initially a Vendor ID and Product ID value may be read from the Mobile Device 102. Data obtained from the Mobile Device 120 through the cable 110, (or 110A, or 110B) may have to be further decoded to extract and identify the Product ID information. Carrier ID (that is, an identifier of the mobile service operator provider that provided service to the mobile device) may be obtained from the Mobile Device 120 during this step or afterwards. In addition, a "pairing status" determination may be obtained from the Mobile Device 120, particularly as some mobile devices such as smart watches may not be repaired/recycled if they were previously paired with a particular mobile device and that pairing has not been cleared. As part of the pairing status assessment, aspects of the present invention determine what SIM card is installed, and/or whether an eSIM is utilized in the Mobile Device 120. In this step, information from the SIM/eSIM card can be obtained, and a determination can be made regarding the last active network, and from that determination, aspects of the present invention determine through which SIM the device was last active. Knowing the carrier is valuable information to the recycler (and retailer) as Mobile Devices 120 may be of higher value when previously associated with particular carriers.

Determine Lock Status

Aspects of the present invention also may determine a lock status of the Mobile Device 120. In various embodiments, the Mobile Device 120 is examined to determine all possible lock states of the device, whether they are pin locks, passcode locks, Mobile Device Management ("MDM") locks, Find My Phone ("FMIP") activation locks, or any other kind of locks. In various embodiments, aspects of the present invention are capable of performing diagnostic and provisioning when some lock states are still present on the mobile device. On the other hand, some lock states may indicate that further processing for the particular mobile device should be immediately discontinued; for example, if an iOS-based mobile device is locked through an FMIP Activation Lock, the device may be quickly identified to discontinue testing (potentially saving extensive diagnosis and look up through third party databases to determine FMIP status). Also as part of this step, a determination may be made as to whether Mobile Device 120 was jailbroken (in the case of iOS) or rooted (in the case of Android). In many circumstances, recyclers do not wish to recondition previously jailbroken or rooted mobile phones as the potential exists for residual malware remaining on such devices. Early identification of jailbroken and/or rooted state therefore saves the recycler time in performing diagnostics and attempted erasure.

Obtain General Information from Mobile Device.

In yet another embodiment, provided that the device is remains accessible based on its lock status, general information is obtained from the mobile device and logged within the Host System 105. Such general information may include information that is valuable to a device recycler or a retail operation, such as the device's registered model number, color, marketing name, IMEI, operating system version number, firmware version number, serial number, memory size, rooted/jailbroken status (as mentioned above), and carrier ID/carrier code, among other things. In one aspect, a first collection of information may be obtained from an Android-based Mobile Device 120 where ADB has not been activated, and a second larger set of information may be obtained if embodiments of the present invention activate ADB on the Mobile Device 120. In another aspect, full identification of over 20,000 parameters in iOS-based devices may be obtained by aspects of the present invention without first installing an app on an iOS-based mobile device. General information, once obtained from the Mobile Device 120 by the Host System 105 is stored for presentation to the end user, or for use in further processing particular diagnostics or provisioning steps.

Extract and Identify Auto-Diagnostics

Many types of mobile devices conduct routine internal diagnostics and store the results of the diagnostics in the mobile device in a variety of ways including diagnostic logs. These "auto-diagnostic" test result logs are not normally accessible to the end user, and may be difficult to understand in their encoded form, yet contain information that once read and decoded can quickly indicate to a device recycler or end user a functional condition of the mobile device; further, such information may indicate components needing repair or adjustment thus guiding a recycler in planning for refurbishment. In various aspects of the present invention, information obtained from logs stored within the Mobile Device 120 is obtained and decoded by the Host System 105, and those logs are utilized to determine whether various features of the Mobile Device 120 are operating within normal parameters based on expected operational criteria stored within the operating system of the Mobile Device 120.

Regarding embodiments where the iOS operating system is installed on Mobile Device 120, a list of device "entitlements" are obtained by the Host System 105 from the firmware of the Mobile Device 120, and the "entitlements" provide a list of information, features, and commands that the particular Mobile Device 120 may be instructed to perform or report. In this way, a list of potential functions is determined by checking the firmware of the Mobile Device 120, providing for the preparation of a set of diagnostics and provisioning functions used by the mobile device. By analyzing the list of possible commands and reports available for a particular Mobile Device 120, efficiencies are realized in the diagnostics process by restricting actions and information gathering to available functions and reporting based on the particular configuration of the Mobile Device 120. In various embodiments, data may be extracted, decoded, and decompiled based upon certain mapping information obtained from firmware of the Mobile Device 120. Such extracted and decoded information may identify allowable diagnostic ranges for device performance that allow for configuration of the diagnostic software; without such information, in many instances, the person conducting the diagnostic tests may need to guess at allowable performance value ranges and these may lead to incomplete or non-comprehensive device testing. Further, efficiencies are improved for device recyclers or retailers by early identification of "hard stop" conditions such as an activation lock state that renders devices 120 inaccessible for further diagnostics, provisioning, or recycling.

Based on the device type/operating system type, certain custom actions may be undertaken by aspects of the present invention. For example, in the case of Android-based devices 120, certain diagnostic information and commands may be optionally obtained and/or executed by activating the Android Debug Bridge ("ADB") through commands sent from the Host System 105 through a serial connection (such as through the cable 110) between the Host System 105 and the Mobile Device 120, and operating system-based information may be obtained and commands executed on the Mobile Device 120 without installing an app on the Mobile Device 120. In various embodiments, discussed below, ADB may be manually activated by a user of Host System 105, or for particular types of Mobile Devices 120, ADB may be autonomously activated by the software of the Host System 105.

Device Provisioning

Commands may be executed on the Mobile Device 120 to prepare it for resale or re-use, or to otherwise process it for its final disposition. One of such functions may include device erasure that can be accomplished through invoking built-in erasure algorithms that are utilized by the operating system to fully erase the mobile device. In prior approaches, recyclers or retailers commonly installed an app on the Mobile Device 120 to perform erasure, but this process can be extremely time consuming compared to native device erasure invoked by the Host System 105 through its interface to the Mobile Device 120. Erasure of the Mobile Device 120 may be certified by any desired technique, such as by taking a fingerprint of the mobile device's memory, invoking the device native erasure software, allowing erasure to occur, then re-pairing the Mobile Device 120 with the with the Host System 105 to confirm that the fingerprinted memory is no longer present within the Mobile Device 120.

Diagnostic Data Presentation

Information that has been obtained from the Mobile Device 120 is processed and presented, for example thorough a user interface, to the operator of the Host System 105. In various embodiments, the operator of the Host System 105 may select how much information is to be presented, in what arrangement, and with specific content and order.

The above-described process steps of the present invention may be directly executed, partially executed, or executed after the illustrated process 200 terminates 212. Before termination 212, a Device Data Cleanup process 212 may be undertaken in various aspects of the invention, to quickly and administratively clean the Host System 105 to remove any undesired data, logs, or information. This process 212 can be executed after every completion of mobile device processing, or at the end of a batch device processing session.

Embodiments of the Present Invention: Feature Set One

As mentioned above, various diagnostic functions and provisioning processes may be executed on the Mobile Device 120. In a first aspect, a set of features provided by embodiments of the present invention includes, but is not limited to the following six features:

1. Serial Connection for Advanced Diagnostics and Provisioning: In one aspect of the present invention, a serial connection between the Host System 105 and the Mobile Device 120 is established, and the serial connection provides a mechanism to support low-level access to hardware components and firmware. Establishing such serial connection allows access to a rich set of device diagnostic information and built-in commands in a mobile device without first requiring installation of an app on the mobile device.

2. Implementation of a DFU Eraser: for iOS-based devices, an improved erasure process can be invoked through the Host System 105 commanding the Mobile Device 120 to enter DFU mode, and activating an erasure algorithm in the Mobile Device 120. Such erasure provides a faster and more complete mode of erasure, and afterwards, the Mobile Device 120 may be paired and a registry event searched to determine whether there was an "Obliteration" event logged; the results of the erasure validation may be presented on certification of erasure that is uniquely associated with the particular Mobile Device 120 that was erased.

3. MDM Detection: aspects of the present invention provide for Mobile Device Management ("MDM") detection to allow early identification of devices that may have an MDM lock enabled; if such devices are in modes that are inaccessible or otherwise unable to be reconfigured, early identification of MDM mode provides for a quick termination of the diagnostic testing, thus saving the recycler time and improving efficiency by identifying devices for redisposition.

4. eSIM Erasure: mobile devices (particularly those using the iOS operating system) are increasingly incorporating embedded Subscriber Information Modules for network authentication. Aspects of the present invention allow the Host System 105 to command the Mobile Device 120 to initiate erasure of its eSIMs (or, alternatively, SIMs), thus configuring the device for use by a new purchaser, and removing prior user information (and potential Personally Identifiable Information or "PII") from the Mobile Device 120 before the Mobile Device 120 is returned to the stream of commerce.

5. Skip iOS UI Setup: in some mobile devices, particularly those utilizing the iOS operating system, performing certain functions such as installing and launching an app on the mobile device requires the app to be "trusted" through user input. To provide such input indicating trust, the Mobile Device 120 typically must be user accessible; further, on newly-configured/flashed devices, the setup process is often lengthy and requires user entry of information such as WiFi credentials, region of operation, and user trust inputs. In various embodiments of the present invention, the Host System 105, through its connection to the Mobile Device 120 performs functions to skip the normal iOS UI setup process on the Mobile Device 120, thus saving significant amount of time during the diagnostic and provisioning process. Also thereby, further operations such as providing indications of app trust may be undertaken with minimal delay.

6. Serial Component Identification and OEM Component Configuration: embodiments of the present invention, through connection of the Host System 105 to the Mobile Device 120, provide functions that obtain a list of serial numbers of components installed in the Mobile Device 120, allowing a determination through a database lookup of whether such components are original OEM components or were after-market components installed after initial manufacture. This information allows mobile recyclers to more accurately determine value of the devices for resale, particularly for iOS-configured devices, and to plan any necessary upgrades or repair of components currently installed in the Mobile Device 120. Along with the serial component identification, Carrier ID may be obtained and verified for a particular Mobile Device 120.

Embodiments of the Present Invention: Feature Set Two

As mentioned above, various diagnostic functions and provisioning processes may be executed on the Mobile Device 120. In a second aspect, a set of features provided by embodiments of the present invention includes, but is not limited to the following four features:

1. Android Rapid Erasure with Validation: for Android-configured mobile devices, in embodiments of the present invention, a "native" Android command is remotely executed by first activating, through user input, an ADB mode of operation of the mobile device. By executing erasure algorithms already present on the Mobile Device 120, the erasure process completes far more quickly than the previous processes that first required an app to be installed on the Mobile Device 120. Connectivity between the Host System 105 and the Mobile Device 120 is maintained during erasure, and after erasure is complete, storage on the Mobile Device 120 is read by the Host System 105 to confirm whether erasure was successful. If embodiments of the present invention determine erasure was successful, then a Certificate of Erasure uniquely associated with the Mobile Device 120 may be generated to confirm erasure to subsequent users of the Mobile Device 120.

2. Auto ADB Rapid Erasure with Validation. Similar to the Android Rapid Erasure with Validation above, aspects of the present invention cause a native erasure tool on the Mobile Device 120 to erase data from the Mobile Device 120 thorough first activating the Android Debug Bridge without user input. For devices supporting this option, this embodiment provides a more streamlined approach as users do not need to manually activate ADB before executing a native erasure algorithm on the Mobile Device 120. As before, after erasure is complete, storage on the Mobile Device 120 is read by the Host System 105 to confirm whether erasure was successful. If embodiments of the present invention determine erasure was successful, then a Certificate of Erasure uniquely associated with the Mobile Device 120 may be generated to confirm erasure to subsequent users of the Mobile Device 120.

3. Extract Device Configuration Fingerprint: in various situations, it may be useful to a particular recycler, mobile carrier, or other entity to understand the exact configuration of hardware and software installed in a particular mobile device. Embodiments of the present invention utilize the connection between the Host System 105 and the Mobile Device 120 to generate a comprehensive manifest, or "fingerprint," of the mobile device hardware and software. This configuration manifest/fingerprint can then be compared, for example, to a desired "golden" manifest to determine whether the mobile device conforms to necessary minimum standards to operate within a particular network, or to determine whether the device meets other minimum functional performance measures. In various embodiments, core device details and information may be obtained without first installing an app on the Mobile Device 120.

4. Android Diagnostics: In various embodiments, automated diagnostics similar to those described above will be initially performed on Android devices. At the same time, rapid diagnostics may be executed by the Host System 105 on the Mobile Device 120 with or without applications being installed first on the Mobile Device 120.

Embodiments of the Present Invention: Feature Set Three

As mentioned above, various diagnostic functions and provisioning processes may be executed on the Mobile Device 120. In a third aspect, a set of features provided by embodiments of the present invention includes, but is not limited to the following two features:

1. Automatically Enabling Android Debug Bride (ADB) Mode for Certain Devices: in various embodiments of the present invention, some mobile device types may be commanded by the Host System 105 to automatically enable ADB mode to support the performance of advanced diagnostics and provisioning without user intervention. By providing for rapid access to ADB-enabled functionality, aspects of the present invention significantly streamline the diagnostic process by allowing diagnostic and provisioning functions to be undertaken with minimal to no user intervention and without first installing an app on the mobile device.

2. Apple Watch Error Indicator Mitigation: in some instances, such as when an error occurs during an update of an Apple Watch, the operating system of the watch may display a red exclamation mark, and in this mode, the watch is incapable of further normal operation. For mobile device recyclers, this error condition previously indicated a hard stop in the recycling process and the watch would typically be sent for parting out or scrapping. In various aspects of the present invention, an Apple watch displaying a red exclamation mark is interfaced to a connection jig that is connected to a test system such as Host System 105, and embodiments of the present invention may perform functions on the mobile watch such as: removing the red exclamation error state, reading memory of the watch to determine whether data has been previously stored on the watch, and obtaining diagnostic information on components of the watch such as its crown or battery.

The particular implementations shown and described herein are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the following claims, which illustrate non-limiting embodiments of the present invention.

What is claimed is:

1. A method comprising:
electrically connecting a mobile device to a USB port of a host system;
uniquely identifying the USB port and a type of the mobile device attached to the USB port;
adjusting electrical performance of the USB port based on identified device type and desired function;
identifying a current state of the mobile device;
establishing a serial connection between the mobile device and the host system;
performing diagnostics and device provisioning functions for the mobile device;
obtaining a list of serial numbers of components installed in the mobile device;
determining, for each of such installed components, whether each respective component was originally installed at time of manufacture of the mobile device; and
at least one of:
determining a resale value of the mobile device based upon at least whether a respective component was originally installed at time of manufacture of the mobile device; and
planning a repair or upgrade of the mobile device based upon at least whether a respective component was originally installed at time of manufacture;
wherein adjusting electrical performance of the USB port comprises adjusting a resistance device installed in a USB cable between the mobile device and the host system.

2. The method of claim 1, wherein adjusting a resistance in a USB cable between the mobile device and the host system further comprises controlling the resistance device by a control signal communicatively coupled between the host system and the resistance device.

3. The method of claim 1, wherein the method comprises switching a device state of the mobile device in response to identifying a current device state of the mobile device is not one of recovery mode or download mode.

4. The method of claim 1, further comprising providing power to the mobile device through a USB the cable connected between the host system and the mobile device.

5. The method of claim 1, wherein identifying a current state of the mobile device further comprises determining available data connection types for the mobile device.

6. The method of claim 1, wherein the serial connection between the mobile device and the host system comprises one of a USB protocol and an RS-232 protocol.

7. The method of claim 1, further comprising:
retrieving, from the mobile device, a serial number of a component installed in the mobile device; and
determining the component is an originally installed component of the mobile device.

8. The method of claim 1, further comprising: the scanning for any USB hubs that may be interconnected between the USB port of the host system and the mobile device.

9. A system comprising:
a host system comprising a processor, a memory electrically coupled to the processor, a storage device coupled to the processor, a user interface electrically coupled to the processor, and a USB port connection coupled to the processor, wherein the memory is further configured with software that when executed performs the steps of:
electrically connecting a mobile device to a USB port of the host system, the electrical connection further comprising a variable resistance device coupled between the USB port and the mobile device;
uniquely identifying the USB port and a type of the mobile device attached to the USB port;
adjusting electrical performance of the USB port based on identified device type and desired function;
identifying a current state of the mobile device;
establishing a serial connection between the mobile device and the host system;
performing diagnostics and device provisioning functions for the mobile device;
obtaining a list of serial numbers of components installed in the mobile device;
determining, for each of such installed components, whether each respective component was originally installed at time of manufacture of the mobile device; and
at least one of:
determining a resale value of the mobile device based upon at least whether a respective component was originally installed at time of manufacture of the mobile device; and
planning a repair or upgrade of the mobile device based upon at least whether a respective component was originally installed at time of manufacture;
wherein adjusting electrical performance of the USB port comprises adjusting a resistance value in the variable resistance device coupled between the mobile device and the host system.

10. The method of claim 9, wherein adjusting the resistance value in the variable resistance device further comprises controlling the variable resistance device by a control signal communicatively coupled between the host system and the variable resistance device.

11. The system of claim 9, wherein the system comprises switching a device state of the mobile device in response to identifying a current device state of the mobile device is not one of recovery mode or download mode.

12. The system of claim 9, further comprising providing power to the mobile device through a USB the cable connected between the host system and the mobile device.

13. The system of claim 9, wherein identifying a current state of the mobile device further comprises determining available data connection types for the mobile device.

14. The system of claim 9, wherein the serial connection between the mobile device and the host system comprises one of a USB protocol and an RS-232 protocol.

15. The system of claim 9, further comprising:

retrieving, from the mobile device, a serial number of a component installed in the mobile device; and determining the component is an originally installed component of the mobile device.

16. The method of claim 9, further comprising: the scanning for any USB hubs that may be interconnected between the USB port of the host system and the mobile device.

\* \* \* \* \*